(12) United States Patent
Tsurumoto et al.

(10) Patent No.: US 8,390,746 B2
(45) Date of Patent: Mar. 5, 2013

(54) REMOTE CONTROL METHOD AND REMOTE CONTROL APPARATUS

(75) Inventors: Takashi Tsurumoto, Saitama (JP); Akira Katsuyama, Kanagawa (JP)

(73) Assignee: Sony Corporation (JP)

(*) Notice: Subject to any disclaimer, the term of this patent is extended or adjusted under 35 U.S.C. 154(b) by 672 days.

(21) Appl. No.: 12/378,908

(22) Filed: Feb. 20, 2009

(65) Prior Publication Data

US 2009/0213278 A1 Aug. 27, 2009

(30) Foreign Application Priority Data

Feb. 21, 2008 (JP) .............................. P2008-039523

(51) Int. Cl.
*H04N 5/44* (2011.01)
(52) U.S. Cl. ........................................ 348/734; 348/552
(58) Field of Classification Search .................. 348/734, 348/552–553, 723, 725; 340/25.25, 825.22, 340/825.69, 825.72
See application file for complete search history.

(56) References Cited

U.S. PATENT DOCUMENTS

| | | | |
|---|---|---|---|
| 4,817,203 A | | 3/1989 | Tsurumoto et al. |
| 6,400,280 B1 * | | 6/2002 | Osakabe ...................... 340/4.41 |
| 6,940,562 B2 * | | 9/2005 | Sato ............................. 348/734 |
| 6,985,069 B2 * | | 1/2006 | Marmaropoulos ........ 340/12.26 |
| 7,821,377 B2 * | | 10/2010 | Arai et al. .................... 340/3.71 |
| 2005/0151886 A1 | | 7/2005 | Hirano |
| 2007/0195195 A1 * | | 8/2007 | Hicks ............................ 348/552 |

FOREIGN PATENT DOCUMENTS

| | | |
|---|---|---|
| JP | 62-284583 A | 12/1987 |
| JP | 2000152349 A | 5/2000 |
| JP | 2005-198115 A | 7/2005 |

OTHER PUBLICATIONS

Office Action from Japanese Application No. 2008-039523, dated Feb. 2, 2010.

* cited by examiner

*Primary Examiner* — Trang U Tran
(74) *Attorney, Agent, or Firm* — Lerner, David, Littenberg, Krumholz & Mentlik, LLP

(57) ABSTRACT

A remote control method for a device under control which selects one of an information signal of the device under control and an information signal from at least one external device is disclosed. The device under control is inquired about an information signal selection state when a key in common with the device under control and the external device is operated on an operation section. A remote control signal corresponding to the key that has been operated is transmitted to the device under control when the information signal selection state replied from the device under control represents a signal selection state of the device under control. A remote control signal corresponding to the key that has been operated is transmitted to the external device when the information signal selection state replied from the device under control represents a signal selection state of the external device.

4 Claims, 7 Drawing Sheets

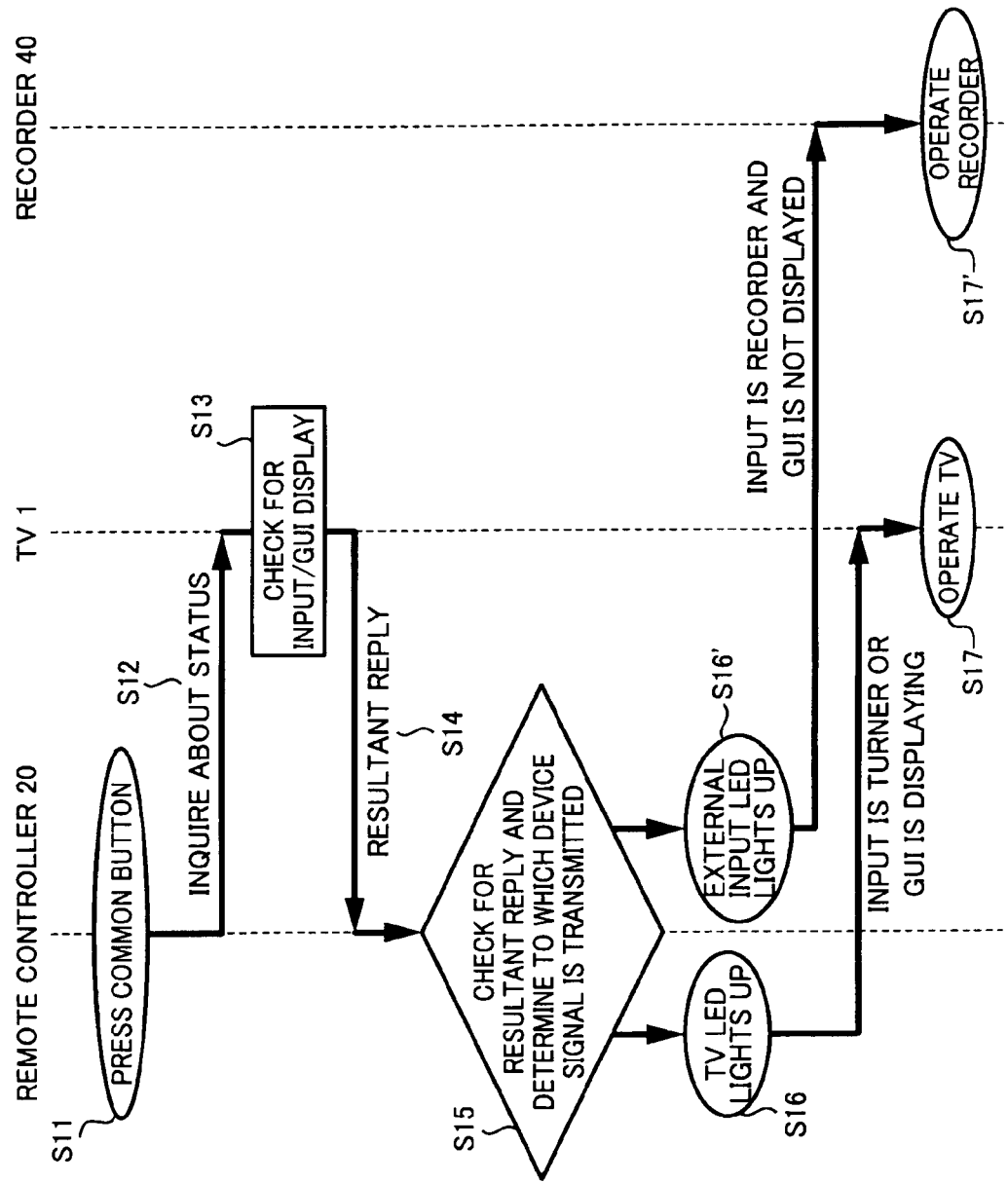

REMOTE CONTROL METHOD AND REMOTE CONTROL APPARATUS

CROSS REFERENCES TO RELATED APPLICATIONS

The present application claims priority from Japanese Patent Application No. JP 2008-039523, filed in the Japanese Patent Office on Feb. 21, 2008, the entire content of which is incorporated herein by reference.

BACKGROUND OF THE INVENTION

1. Field of the Invention

The present invention relates to a remote control method and a remote control apparatus applied to remotely control, for example, a television receiver.

2. Description of the Related Art

External devices such as a recording device and a video signal reproduction device are connected to a television receiver. Video signals as information signals received from these devices are displayed on a display section such as a liquid crystal display (LCD) monitor of the television receiver. If respective remote control apparatus (hereinafter referred to as remote controllers) are used for the television receiver and individual external devices, since the number of remote controllers corresponding to the number of these devices increases, the user feels inconvenient.

A remote controller that can remotely control a television receiver and a plurality of devices such as a recording device is known as a so-called multi-remote controller. FIG. 1A shows an example of a multi-remote controller of a related art. Connected to a television receiver 1 is an external AV device, for example, a recorder 40 such as a Blu-ray disc recorder. Connected between the television receiver 1 and the recorder 40 is an analog interface or a digital interface 9 (not shown) that can exchange video signals or audio signals.

A remote controller 20 includes an operation section having a plurality of buttons (also called keys). The operation section includes common buttons that control the television receiver 1 and the recorder 40 and device dedicated buttons. The remote controller 20 includes a TV input section button 31 and selection buttons 32a and 32b. FIG. 1A shows an outline of the remote controller 20, part of which is omitted.

The TV input section button 31 is used to select a picture displayed on a display section 2 of the television receiver 1. In other words, the TV input section button 31 selects one of an output video signal of an internal tuner of the television receiver 1 and a video signal from the recorder 40. The TV input section button 31 is structured to toggle one selection state to another selection state whenever pressed.

The selection buttons 32a and 32b are buttons used to set up respective devices to be controlled. When the selector button 32a is pressed, the remote controller 20 generates a control code to control the television receiver 1. When the selector button 32b is pressed, the remote controller 20 generates a control code to control the recorder 40. A control code is transmitted as an infrared signal or a radio wave to the television receiver 1 or the recorder 40.

A table of control codes has been stored in a non-volatile memory of the remote controller 20 such that a control code can be generated according to the category (or device type) and a manufacturer name of an external device. Categories represent concepts of Blu-ray disc recorder, DVD recorder, VCR, and so forth. Device types represent those identified by categories, manufacturer names, and device type numbers. If the remote controller 20 is packaged along with the television receiver 1, the remote controller 20 can transmit control codes that the remote controller 20 can interpret without necessity of a special setup operation. However, with respect to the recorder 40, the remote controller 20 is necessary to be set up for the recorder 40 about it manufacturer name (or device type).

For example, a list of manufacturer codes (or an instruction manual) is provided. With reference to the list, an initial setup is performed to control the recorder 40. Specifically, control codes are set up with buttons of the remote controller 20.

By pressing the TV input section button 31, the user selects an output of the internal tuber or a reproduction output of the recorder 40 as a picture to be displayed on the television receiver 1. Thereafter, by pressing the selector button 32a or 32b corresponding to the selection state of the TV input section button 31, the user can control the device that outputs a picture that is being displayed.

In the multi-remote controller of the related art, unless the TV input state matches the selection state of the remote controller, the remote controller is not capable of controlling a picture that the user is watching. For example, a situation in which even if the user presses a channel up/down button with the remote controller, the channel of the television receiver is not changed to another channel occurs.

As shown in FIG. 1B, the TV input section button 31 that toggles one state to another state is separated into a TV input button 31a and an external input button 31b. When the TV input button 31a is pressed, the state in which the output of the internal tuner of the television receiver 1 is selected occurs. When the external input button 31b is pressed, the state in which a video signal of the recorder 40 is selected occurs. The TV input button 31a and the external input button 31b are self-illuminated buttons. Although the user can easily know the input selection state with these buttons in comparison with that of the toggle-type TV input selection button 31, the number of buttons adversely increases.

As shown in FIG. 1C, the function of the TV input button 31a (that selects an output of the internal tuner as a picture to be displayed) and the function of the selection button 32a (that sets up the remote controller 20 to generate control codes for the television receiver 1) are integrated by one button 33a. Likewise, the function of the external input button 31b (that selects the output of the recorder 40 as a picture to be displayed) and the function of the selector button 32b (that sets up the remote controller 20 to generate control codes for the recorder 40) are integrated by one button 33b.

In this structure, a problem in which the input selection state of the television receiver 1 does not match the selection state of the remote controller 20 can be prevented. However, if there are a plurality of remote controllers that control the television receiver 1 and the recorder 40, it is likely that the state in which the remote controller 20 does not match the TV input state occurs. In addition, if the TV input is changed with a button of the television receiver 1 instead of the remote controller 20, such a mismatch state may occur.

Next, with reference to FIG. 2, further, another example of a multi-remote controller of a related art will be described. This example is described in Japanese Patent Application Laid-Open Publication No. SHO 62-284583, hereinafter referred to as Patent Document 1. Japanese Patent Application Laid-Open Publication No. 2005-198115, hereinafter referred to as Patent Document 2, describes a remote controller that integrates the foregoing TV input selection button and the device selection buttons.

A connection 34 is disposed between the television receiver 1 and the recorder 40 to transmit control codes to the recorder 40. The connection 34 is, for example, a digital interface. The remote controller 20 has the TV input selection button 31. When a common connection button is pressed on the remote controller 20, it transmits a control code that represents the pressed button to the television receiver 1 without changing the control code.

When the television receiver 1 receives a code from the remote controller 20, if the television receiver 1 is displaying an output of the internal tuner, the television receiver 1 itself receives the code. In contrast, if the television receiver 1 is selectively displaying an external input from the recorder 40, the television receiver 1 transmits the received code to the recorder 40 through the connection 34. In this case, the television receiver 1 has a table that converts the received code into a control code that the recorder 40 can understand. The converted code is supplied to the recorder 40 through the connection 34.

The remote control method shown in FIG. 2 can solve the foregoing problem of the related art. The multi-remote controller described with reference to FIG. 1A is not capable of controlling a picture that the user is watching unless the TV input state matches the selection state of the remote controller. However, in the method shown in FIG. 2, since the television receiver 1 that receives a code from the remote controller determines the own input selection state, even if such a mismatch occurs, the remote controller can remotely control an objective device.

In the multi-remote controller described with reference to FIG. 1C, if there are a plurality of remote controllers, it is likely that the state of the remote controller 20 does not match the TV input state. If the TV input is selected with a button of the television receiver 1 instead of the remote controller 20, such a mismatch state may occur. However, in the method shown in FIG. 2, the device can be remotely controlled even if such a mismatch state occurs.

SUMMARY OF THE INVENTION

However, the structure of the related art shown in FIG. 2 has the following problems.

This structure necessitates a process that converts a code that represents a button received by the television receiver 1 into a control code that an external device (recorder 40) can understand. In addition, it takes a time until a button is pressed on the remote controller 20 until a corresponding control code is transmitted to the external device, resulting in deterioration of response and maneuverability. With respect to a code with which the television receiver 1 does not deal for the external device, it is not able to be remotely controlled with the code. When a button dedicated for the recorder 40 is pressed on the remote controller 20, if the television receiver 1 does not convert a code that represents the button into a control code of the recorder 40, the recorder 40 is not controlled with the code.

In view of the foregoing, it would be desirable to provide a remote control method and a remote control apparatus that can solve problems involved in the foregoing multi-remote controller of the related art.

According to an embodiment of the present invention, there is provided a remote control method for a device under control which selects one of an information signal of the device under control and an information signal from at least one external device. The device under control is inquired about an information signal selection state when a key in common with the device under control and the external device is operated on an operation section. A remote control signal corresponding to the key that has been operated is transmitted to the device under control when the information signal selection state replied from the device under control represents a signal selection state of the device under control. A remote control signal corresponding to the key that has been operated is transmitted to the external device when the information signal selection state replied from the device under control represents a signal selection state of the external device.

The device under control preferably includes a display section. When the information signal selection state denotes that the display selection displays a GUI display, a remote control signal corresponding to the button signal is transmitted to the device under control.

The device under control is inquiring about the information signal selection state corresponding to an operation of any of keys operated on the operation section as well as an operation of a common button.

The remote control signal may be transmitted to the external device through a remote control signal conversion device.

According to an embodiment of the present invention, there is provided a remote control apparatus for a device under control which selects one of an information signal of the device under control and an information signal from at least one external device. The remote control apparatus includes an operation section, a conversion section, and a control section. The conversion section bidirectionally communicates with the device under control. The control section inputs an operation signal from the operation section and controls the communication section. The control section inquires of the device under control about an information signal selection state when a key in common with the device under control and the external device is operated on an operation section. The control section controls the communication section to transmit a remote control signal corresponding to the key that has been operated to the device under control when the information signal selection state replied from the device under control represents a signal selection state of the device under control. The control section controls the communication section to transmit a remote control signal corresponding to the key that has been operated to the external device when the information signal selection state replied from the device under control represents a signal selection state of the external device.

According to an embodiment of the present invention, after a selection state of an information signal of a device under control has been actually checked, a remote control signal is transmitted to the device under control or an external device according to a selected information signal. Thus, a problem in which the remote control device does not control the device under control or the external device does not occur. In addition, unlike the structure that the device under control receives a remote control signal and transmits a control code to the external device, according to an embodiment of the present invention, a delay after the remote control device is operated until the external device is operated can be decreased.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 7 is a flow chart showing a process of an embodiment of the present invention.

DETAILED DESCRIPTION OF THE PREFERRED EMBODIMENTS

Figure 1A:
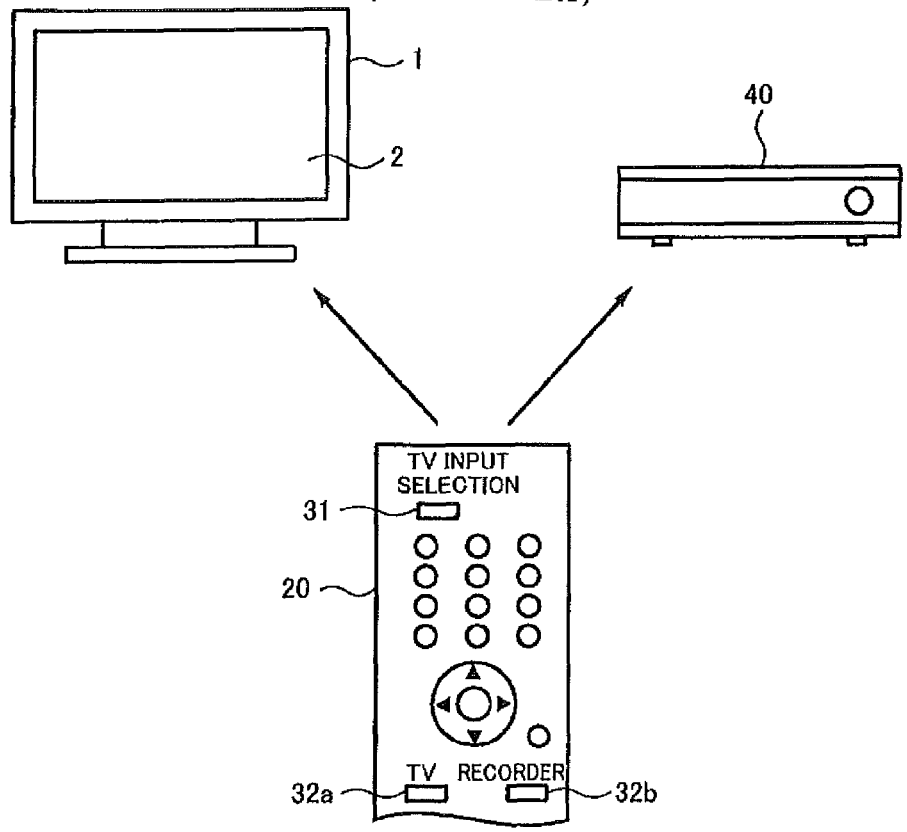
FIG. 1A, FIG. 1B, and FIG. 1C are schematic diagrams describing outlines of remote controllers of related arts.
Figure 1B:
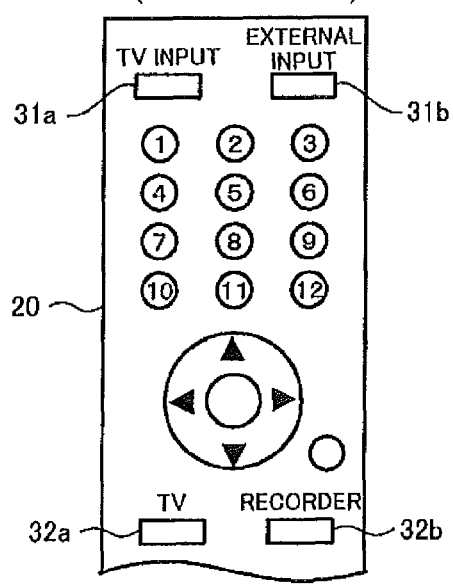
Figure 1C:
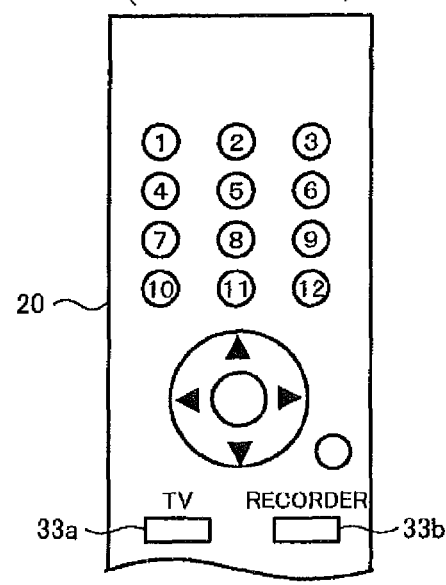
Figure 2:
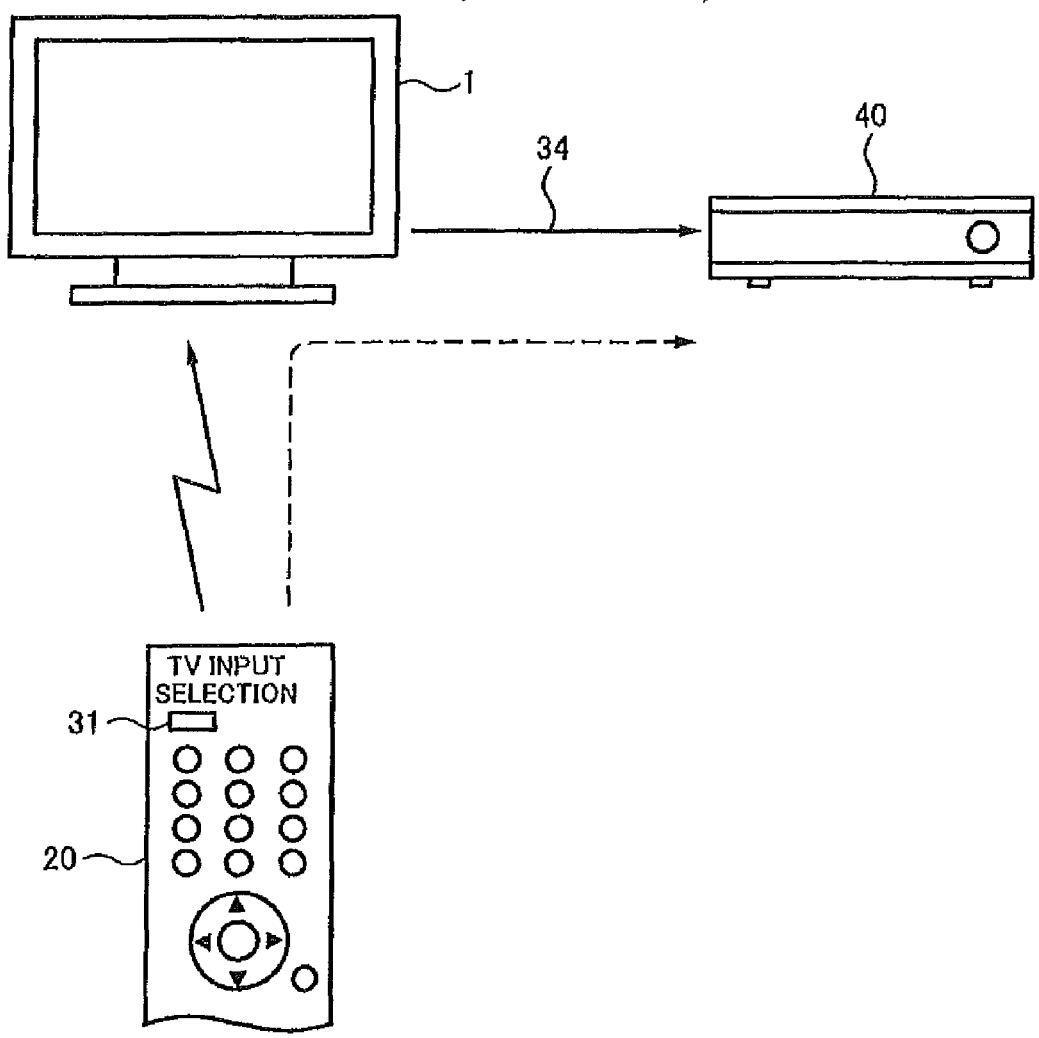
FIG. 2 is a schematic diagram describing an outline of a remote controller of a related art.

Next, with reference to the accompanying drawings, embodiments of the present invention will be described. Although these embodiments that will be described in the following are preferred ones of the present invention and various technically preferably limitations are imposed thereto, it is appreciated that the scope of the present invention is not limited to these embodiments unless described that they impose the present invention.

Next, with reference to FIG. 3, an embodiment of the present invention will be described. An external AV device, for example, a recorder 40 such as a Blu-ray disc recorder, is connected to the television receiver 1. Connected between the television receiver 1 and the recorder 40 is an analog interface or a digital interface (not shown) that can exchange audio signals, video signals, and so forth therebetween.

A remote controller 20 includes an operation section having a plurality of buttons (also called keys). The operation section includes common buttons that control the television receiver 1 and the recorder 40 and device dedicated buttons. FIG. 3 shows an outline of the remote controller 20. A more specific structure of the remote controller 20 will be described later.

The TV input section button 31 is used to select a picture displayed on a display section 2 of the television receiver 1. In other words, the TV input section button 31 selects one of an output video signal (broadcast program) of an internal tuner of the television receiver 1 and a video signal from the recorder 40. The TV input section button 31 is structured to toggle one selection state to another state whenever pressed.

In this embodiment, the remote controller 20 is packaged along with the television receiver 1. The remote controller 20 remotely controls the television receiver 1 according to a bidirectional radio (RF) communication system. Instead, the remote controller 20 remotely controls the recorder 40 according to a relatively high-speed bidirectional communication system, for example, an optical communication system other than the RF communication system. Instead, the remote controller 20 may remotely control the recorder 40 according to a monodirectional communication system. Further, the remote controller 20 may remotely control the recorder 40 according to an infrared system.

The remote controller 20 is a multi-remote controller and can transmit respective control codes for the television receiver 1 and the recorder 40 as remote control signals. As described above, when the remote controller 20 is packaged along with the television receiver 1, control codes for the television receiver 1 have been set up in the remote controller 20. With respect to external devices such as the recorder 40, a table of control codes has been stored in a non-volatile memory of the remote controller 20 such that it can generate control codes according to the category (or device type) and manufacture name of the external device.

For example, a list of manufacturer codes (or an instruction manual) is provided. With reference to the list, an initial setup is performed to control the recorder 40. Specifically, control codes are set up with buttons of the remote controller 20. When the remote controller 20 remotely controls the television receiver 1 and the recorder 40 according to an RF system, the remote controller 20 and each of the television receiver 1 and the remote controller 20 have been initially setup. These initial setups are referred to as pairing. By changing a destination address (ID) of data transmitted according to the RF system, the device controlled by the remote controller 20 is changed between the television receiver 1 and the recorder 40.

Figure 3:
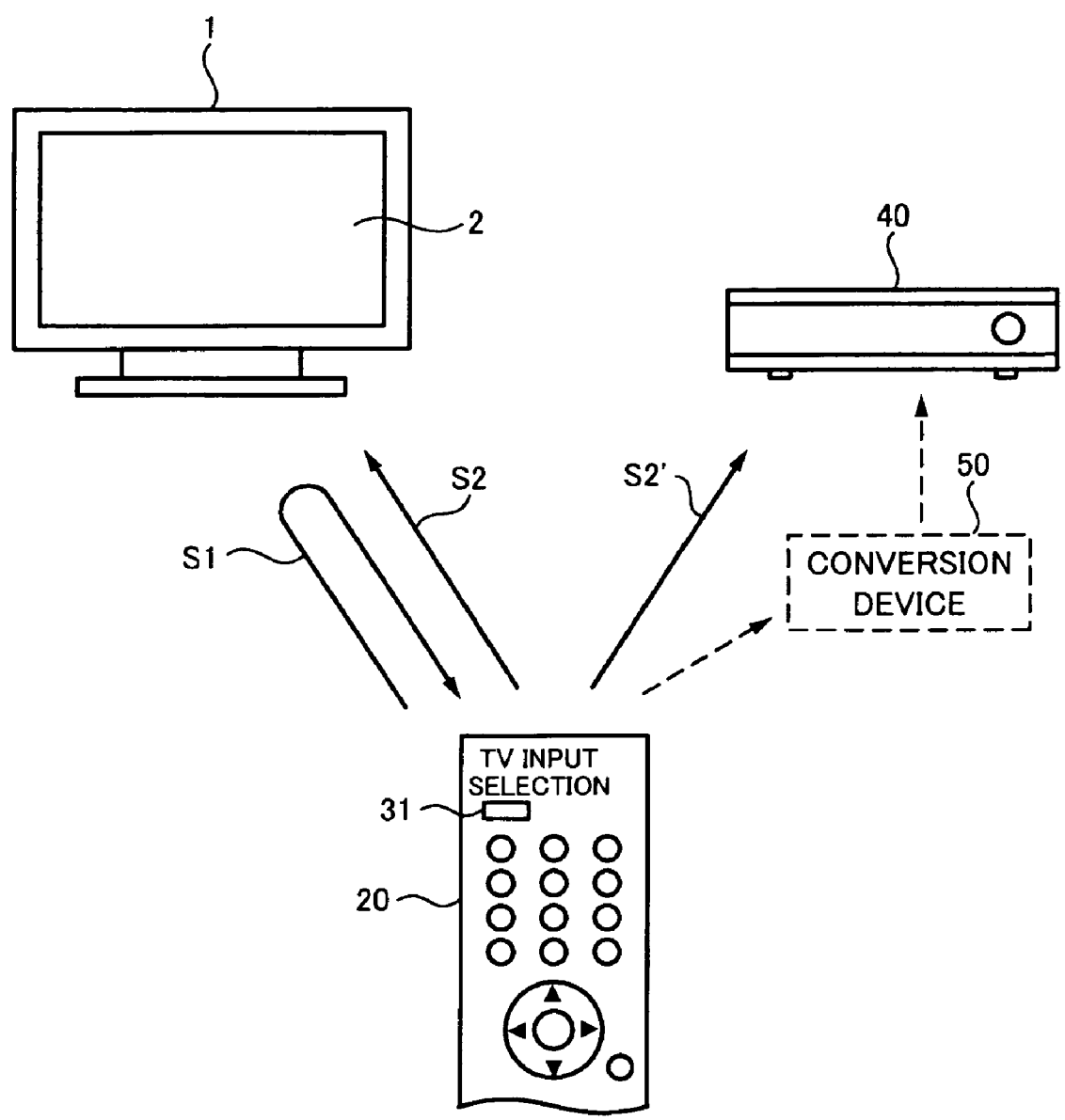
FIG. 3 is a schematic diagram describing an outline of an embodiment of the present invention.

As represented by a broken line shown in FIG. 3, a code conversion device 50 may be provided such that a remote control signal is transmitted from the remote controller 20 to the code conversion device 50 and a control code is transmitted from the code conversion device 50 to the recorder 40. The code conversion device 50 may convert, for example, an RF signal (radio control signal) transmitted by the remote controller 20 into an infrared (Ir) signal.

Next, with reference to FIG. 3, a process of an embodiment of the present invention will be described in brief. When one of the buttons is operated on the remote controller 20, the remote controller 20 inquires of the television receiver 1 about a video signal selection state of a video signal displayed on the display section 2 and the television receiver 1 sends back a reply of its current video signal selection state to the remote controller 20 (at step S1). If the remote controller 20 is an RF type remote controller, the television receiver 1 immediately sends back a reply of its video signal selection state to the remote controller 20.

When the reply of the video signal reception state denotes that a video signal of a broadcast received by the internal tuner of the television receiver 1 or a graphical user interface (GUI) signal has been selected, the remote controller 20 transmits a control code corresponding to the operated button to the television receiver 1 (at step S2). In contrast, when the reply of the video signal selection state denotes that a reproduction video signal of the recorder 40 has been selected, the remote controller 20 transmits a control code corresponding to the operated button to the recorder 40 (at step S2').

A control code transmitted to the television receiver 1 corresponds to the manufacture name (may be the production year, device type number, or the like) of the television receiver 1. Likewise, a control code transmitted to the recorder 40 corresponds to the manufacturer name (may be the production year, device type number, or the lie) of the recorder 40. The remote controller 20 has been initially set up such that it transmits control codes corresponding to individual devices.

Since the remote controller 20 is controlled as described above, the situation in which the TV input selection state of the remote controller 20 does not match a device that outputs a picture displayed to the display section 2 of the television receiver 1 can be prevented. Thus, a trouble of which an operation of a device is not controlled with an operated button can be prevented. In addition, since the remote controller 20 directly controls the recorder 40, it provides high response and maneuverability unlike the case that the recorder 40 is controlled through the television receiver 1. In addition, when a button that control the recorder 40 as an external device to perform a special operation is pressed on the remote controller 20, the recorder 40 can be controlled according to the button.

Figure 4:
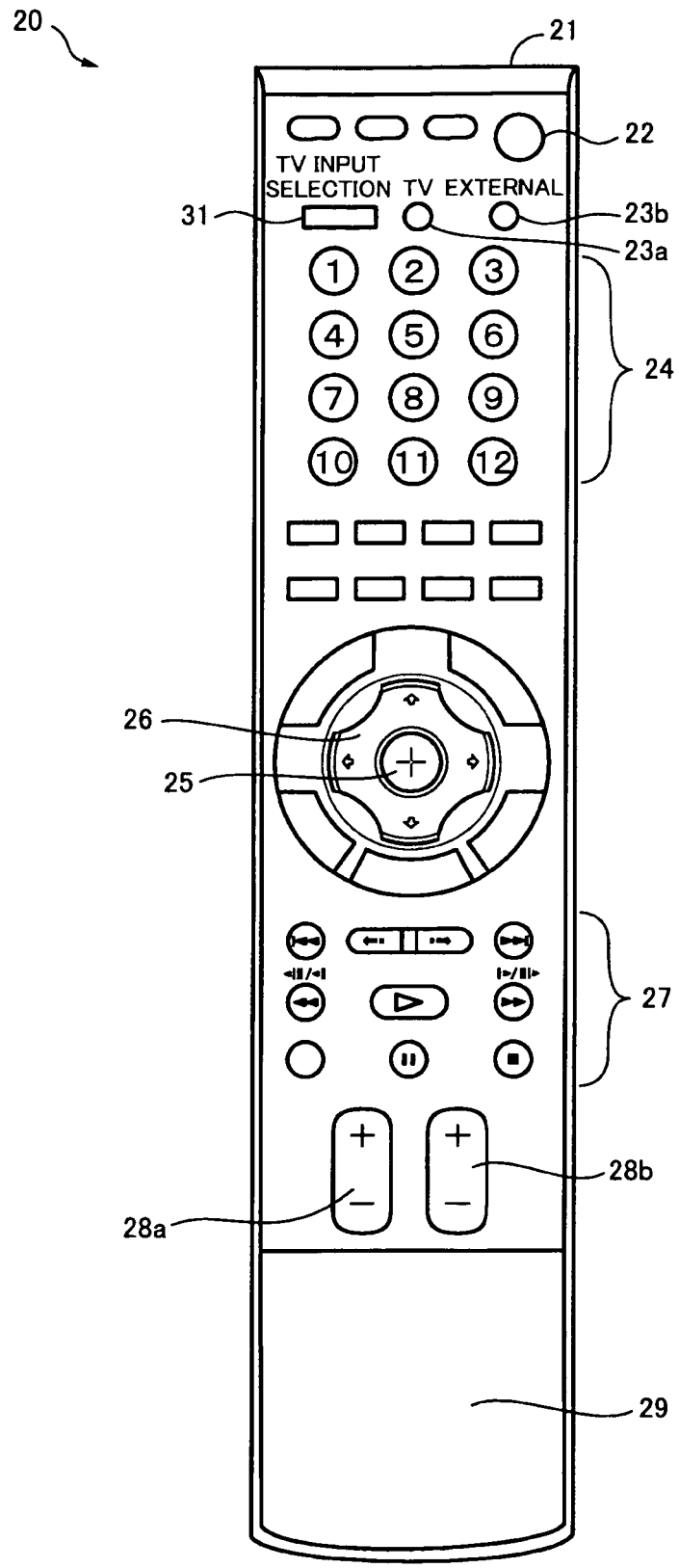
FIG. 4 is a schematic diagram showing an example of a button arrangement of a remote controller according to an embodiment of the present invention.

Next, this embodiment will be described in more detail. FIG. 4 shows an example of an appearance of the structure of the remote controller 20. The remote controller 20 shown in FIG. 4 includes a plurality of buttons disposed on the front surface of the housing; a transmission/reception section 21 that transmits and receives RF signals; and a slidable shutter 29 that can open and close the remote controller 20. There are a plurality of operation buttons inside the shutter 29.

The plurality of operation buttons includes a power on/off button 22, the TV input selection button 31, numeric buttons 24, an enter button 25, a directional button 26, operation buttons 27 for playback, stop, and so forth of the AV device, a volume up/down button 28a, and a channel up/down button 28b. The TV input selection button 31 is a toggle switch used to operate a selector (that will be described later) to select a picture displayed on the display section 2 of the television receiver 1. A light emitting diode (LED) 23a or 23b lights up corresponding to the reply from the television receiver 1.

The buttons of the remote controller 20 can be categorized as those used to commonly control the television receiver 1 and the external device (recorder 40) (these buttons are referred to as common buttons), those dedicated for the television receiver 1 (hereinafter referred to as TV dedicated buttons), and those dedicated for the external device (hereinafter referred to as external device dedicated buttons). The power on/off button 22, the numeric buttons 24, the enter button 25, the directional button 26, the channel up/down button 28b, and so forth are categorized, for example, as the common buttons. On the other hand, the TV input selection button 31, the volume up/down button 28a, and so forth are categorized, for example, as the TV dedicated buttons. Moreover, the operation buttons 27 for playback, stop, and so forth of the AV device are categorized, for example, as the external device dedicated buttons.

In the foregoing embodiment of the present invention, it is sufficient to make an inquiry of the television receiver 1 about the video signal selection state only when one of the common buttons is pressed on the remote controller 20. The TV dedicated buttons are necessary to control only the television receiver 1. Likewise, the external device dedicated buttons are necessary to control only the external device (recorder 40). A control code that occurs when one of these dedicated buttons is pressed is a code that controls only a corresponding device. Likewise, an RF signal transmitted by the remote controller 20 can be a signal received only by a corresponding device. Thus, when a dedicated button is pressed, it is not necessary to change a signal transmitted from the remote controller 20 according to the video signal selection state of the television receiver 1.

Figure 5:
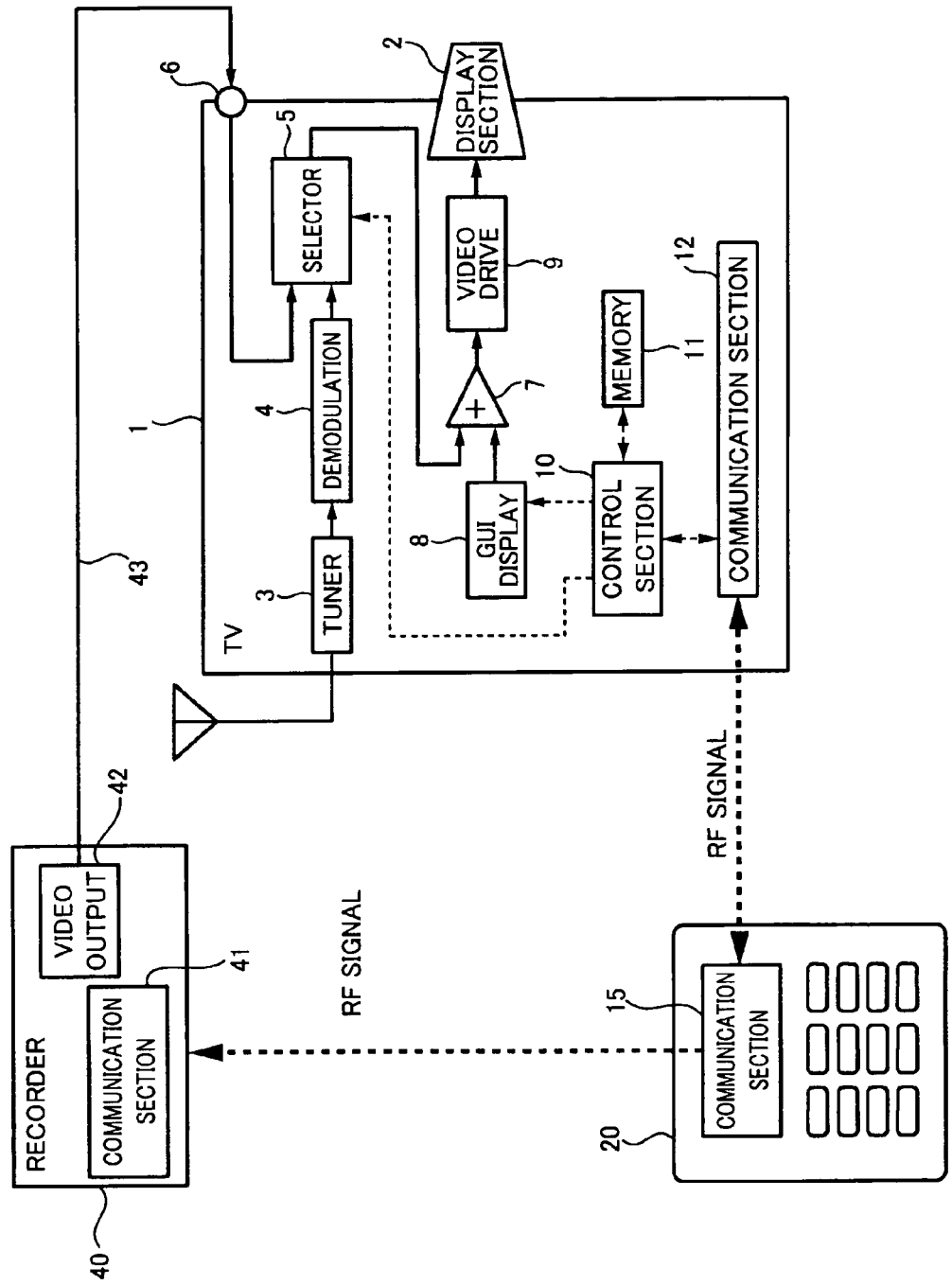
FIG. 5 is a block diagram showing an overall structure of an embodiment of the present invention.

FIG. 5 shows an overall structure of an embodiment of the present invention. A communication section 15 of the remote controller 20 bidirectionally communicates with a communication section 11 of the television receiver 1 to transmit and receive RF signals therebetween. Likewise, the communication section 15 of the remote controller 20 bidirectionally communicates with a communication section 41 of the recorder 40 to transmit and receive RF signals therebetween. The remote controller 20 includes a button section that generates a key signal when a button is pressed; a control section to which a key signal is supplied from the button section; and a communication section that converts a control code corresponding to a key signal generated by the control section into an RF signal, transmits the RF signal, and receives an RF signal from the television receiver 1. The control section is a microcomputer composed, for example, of a central processing unit (CPU), a read-only memory (ROM), a random access memory, and so forth. The central section executes programs stored in the ROM and so forth to control the remote controller 20.

The control section controls the communication section to inquire of the television receiver 1 about the video signal selection state of the television receiver 1 and receives a reply from the television receiver 1. The reply contains information denoting whether the video signal section state is an output of the internal tuner of the television receiver 1 or a reproduction video signal of the recorder 40. Based on the information that represents the video signal selection state, a control code corresponding to an operated common button is controlled to be output to the television receiver 1 or the recorder 40.

The television receiver 1 has a tuner 3 that selects a desired channel from a broadcast radio wave received by an antenna. An output signal of the tuner 3 is demodulated into a baseband video signal by a demodulation section 4. The tuner 3 and the demodulation section 4 may be structured to receive a digital broadcast instead of an analog broadcast. A video signal that is output from the tuner 3 is supplied to one input terminal of a selector 5.

The recorder 40 as an external device decodes a signal reproduced from a record medium, for example, an optical disc and outputs the resultant base band video signal from a video output section 42 having an output connector. The video output section 42 and a video input terminal 6 of the television receiver 1 are connected by a cable 43. A reproduction video signal of the recorder 40 is supplied to the selector 5 of the television receiver 1. A broadcast video signal (not shown) received by the television receiver 1 is supplied to the recorder 40 and recorded on a record medium by the recorder 40.

The selector 5 selects one of the video signal received by the tuner 3 and the reproduction signal of the recorder 40. The video signal selected by the selector 5 is supplied to a superimposing circuit 7. A GUI signal is received from a GUI display signal generation section 8 and supplied to the superimposing circuit 7. An output signal of the superimposing circuit 7 is supplied to the display section 2 using a display device such as an LCD through a video drive 9 and displayed as a picture thereon. The GUI displays a menu, an electrical program guide (EPG) setup screen, and so forth on the display section_2 such that the user sets up the tuner 3 or the recorder 40 with the enter button 25 and the directional button 26 of the remote controller 20. Although the GUI display is not a mode in which a picture received by the tuner 3 is displayed, the remote controller 20 is necessary to control the television receiver 1 unlike the case that a reproduction video signal of the recorder 40 is displayed.

The television receiver 1 is controlled by a control section 10. The control section 10 is a microcomputer composed, for example, of a CPU, a ROM, a RAM, and so forth. By executing programs stored in the ROM or the like, the control section 10 totally controls each section of the television receiver 1. In addition, the communication section 11 is connected to the control section 10. Moreover, a memory 11 is connected to the control section 10.

The control section 10 controls a video signal selection operation of the selector 5. In addition, the control section 10 controls transmission and reception operations of the communication section 12 and the GUI display signal generation section 8 to cause the GUI display signal generation section 8 to display a desired GUI display. In addition, the control section 10 controls various types of operations for the television receiver 1.

In the structure shown in FIG. 3, the communication section 12 of the television receiver 1 and the communication section 15 of the remote controller 20 bidirectionally communicate with each other. The communication section 41 of the recorder 40 and the communication section 15 of the remote controller 20 bidirectionally communicate with each other. These communication sections have a nearly similar structure. Next, examples of the communication sections will be described.

Figure 6A:
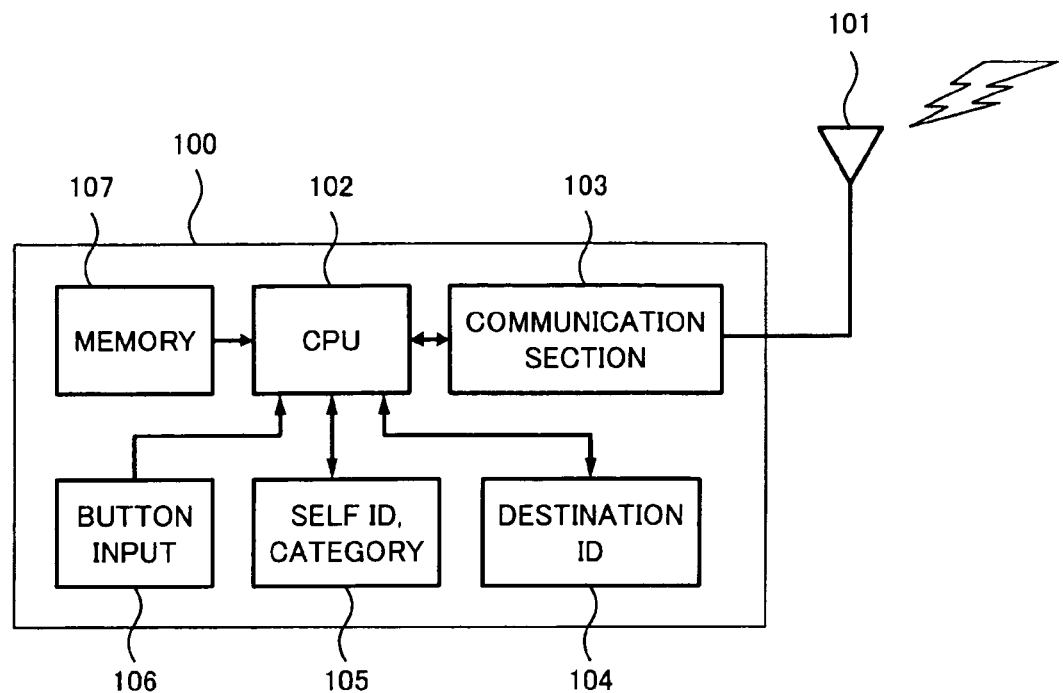
FIG. 6A and FIG. 6B are block diagrams showing structures of communication devices of RF type remote controllers according to an embodiment of the present invention.

As shown in FIG. 6A, a remote controller communication device 100 corresponding to the communication section 15 of the remote controller 20 has an antenna 101 that transmits and receives radio waves; a microprocessor (hereinafter referred to as the CPU) 102 as a control section that executes programs corresponding to a communication function, read and write operations for a storage medium, and various types of button inputs; a communication section 103 that radio communicates; a storage medium 104 that stores identification information ID of the pairing party; a storage medium 105 that stores an ID of the remote controller 20 itself and a category code of an electronic device with which the remote controller 20 initially pairs; a button input section 106 having buttons; and a memory 107 that generates control codes for remote control. The storage media 104, 105, and 107 are composed, for example, of respective writable non-volatile memories.

The CPU 102 includes a RAM and so forth and executes programs stored in a ROM and so forth to totally control each section of the communication unit 100. Identification information ID stored in the storage medium 104 is the ID of the television receiver 1 and the ID of the recorder 40. An ID corresponding to a communication party that the CPU 102 sets up is used. In addition, the CPU 102 receives a button input from the button input section 106 and identifies the button input as a common button or a dedicated button. In addition, the memory 107 has stored control codes of a plurality of manufacturers to allow control codes for remote control to be matched with those of a manufacturer name of the remote device.

As described above, when a common button is pressed, the CPU 102 transmits an inquiry about a video signal selection state to the television receiver 1 through the communication section 103 and the antenna 101. The CPU 102 receives a reply from the television receiver 1 through the antenna 101 and the communication section 103. The CPU 102 decides a control code according to the reply and transmits a remote control signal (RF signal) containing the decided control code to the device as the remote device through the communication section 103.

Figure 6B:
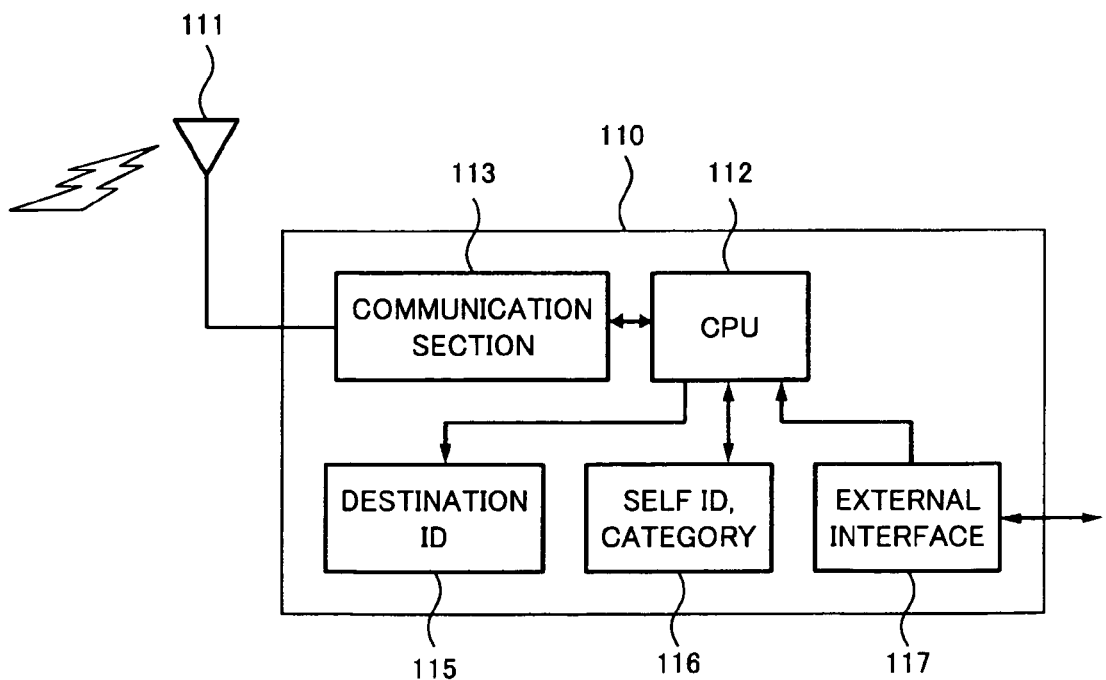

As shown in FIG. 6B, a reception device that receives a remote control signal, for example, a communication device 110 corresponding to the communication section 12 of the television receiver 1, has an antenna 11 that transmits and receives radio waves; a CPU 112 that executes programs corresponding to a communication function, read and write operations for a storage medium, and various types of button inputs; a communication section 113 that radio communicates; a storage medium 115 that stores identification information of the pairing party;

a storage medium 116 that stores an ID of for example the television receiver itself and a category code (a code that represents a category of for example the television receiver); and an external interface 117 with for example the television receiver). The storage medium 115 and the storage medium 116 are composed, for example, of respective non-volatile memories.

The CPU 112 totally controls each section of a reception module 110. The CPU 112 communicates with the control section 10 (see FIG. 3) of the television receiver 1 through the external interface 117. Since the control section 10 controls the selector 5, the control section 10 knows the state of the selector 5. In addition, since the control section 10 controls the GUI display signal generation section 8, the control section 10 recognizes whether or not a GUI signal has occurred. Thus, when the CPU 112 informs the control section 10 through the external interface 117 that the CPU 112 has received an inquiry about the video signal selection state from the remote controller 20, the control section 10 informs the CPU 112 of information (for example, a code composed of at least one bit) through the external interface 117.

The CPU 112 controls the communication section 113 to transmit an RF signal containing information representing the selection state to the remote controller 20 through the antenna 111. In addition, the CPU 112 receives a self-addressed RF signal from the communication section 15 of the remote controller 20 and supplies the RF signal to the control section 10 of the television receiver 1 through the external interface 117. The control section 10 performs an operation based on the received control code.

The communication section 103 of the communication unit 100 and the communication section 113 of the reception module 110 bidirectional communicate with each other according to a predetermined radio communication system, for example, Institute of Electric and Electronic Engineers (IEEE) 802.15.4. IEEE 802.15.4 is one of short range radio network standards, called Personal Area Network (PAN) or Wireless (W)PAN.

The communication rate of this standard is in the range from several 10 kbps to several 100 kbps and the communication distance is in the range from several 10 m to several 100 m. In addition, the communication is performed in the unit of a frame. One frame is composed of a payload (0 to 127 bytes) and a header (6 bytes). Thus, the maximum size of one frame is 133 bytes. In this communication system, one of a plurality of transmission and reception systems can be used. In the remote control system, the simplest method in which the remote control apparatus transmits a command to the apparatus under remote control and the remote control apparatus receives a reply from the device under remote control is used. Instead, more complicated transmission and reception methods than the foregoing methods may be used.

Next, with reference to FIG. 7, a flow of the process of this embodiment will be described. In FIG. 7, respective processes of the control section of the remote controller 20 (the CPU of the communication section 15), the control section of the television receiver 1 (the CPU of the communication section 12 and the control section 10), and the control section of the recorder 40 (the CPU of the communication section 41) are separately illustrated.

First, at step S11, a common button is pressed on the remote controller 20. Information of the pressed common button is stored. When the common button is pressed, the remote controller 20 transmits an inquiry about a video signal selection state (represented as status in FIG. 7) to the television receiver 1 (at step S12).

When the television receiver 1 has received the inquiry, the television receiver 1 checks for the video signal selection states at step S13. In other words, the television receiver 1 checks whether or not the selector 5 is supplying an output of the tuner 3 or a GUI display signal to the display section 2. At step S14, the television receiver 1 transmits a resultant reply that represents the selection state to the communication section 15 of the remote controller 20 through the communication section 12.

When the remote controller 20 receives the resultant replay about the selection state, the remote controller 20 determines to which device it transmits a remote control signal containing a control code of the stored common button based on the resultant reply.

When the determined result at step S15 based on the resultant reply denotes that the current video signal selection state of the television receiver 1 is an output of the tuner 3 or a GUI display signal, the LED 23a (see FIG. 4) lights up (at step S16). A remote control signal corresponding to the pressed button is transmitted from the remote controller 20 to the television receiver 1 and the television receiver 1 is operated according to the remote control signal (at step S17).

When the determined result at step S15 based on the resultant reply denotes that the current video signal selection state of the television receiver 1 is a reproduction video signal of the recorder 40, the LED 23b (see FIG. 4) lights up (at step s16'). A remote control signal corresponding to the pressed button is transmitted from the remote controller 20 to the recorder 40 and the recorder 40 is operated according to the received remote control signal (at step S17').

Since remote control is performed based on the RF system, communication times at step S12 and step S14 are very short. Thus, since a period after a button is operated on the remote controller 20 until a corresponding device is operated can be very short, response is high.

It should be understood by those skilled in the art that various modifications, combinations, sub-combinations and alternations may occur depending on design requirements and other factors insofar as they are within the scope of the appended claims or the equivalents thereof. For example, the number of external devices connected to the television receiver 1 may be two or more. In addition, the radio communication system may be other than IEEE 802.15.4 radio system.

What is claimed is:

1. A remote control method for use with a remote control apparatus for a device under control which selects one of an information signal of the device under control and an information signal from at least one external device, said remote control apparatus having an operation section with a plurality of keys including a number of common keys and a number of dedicated keys, said method comprising the steps of:
    inquiring of the device under control about an information signal selection state when a common key on the operating section of the remote control apparatus is operated;
    transmitting a remote control signal corresponding to the key that has been operated to the device under control when the information signal selection state replied from the device under control represents a signal selection state of the device under control; and
    transmitting a remote control signal corresponding to the key that has been operated to the external device when the information signal selection state replied from the device under control represents a signal selection state of the external device,
    in which the device under control is a television receiver,
    in which each of the common keys commonly controls both the television receiver and the external device, and each of the dedicated keys controls only one of the television receiver and the external device,
    in which the inquiring step is only performed when a common key is operated such that the inquiring step is not performed when a dedicated key is operated, and
    in which the selection state indicates whether a video currently being displayed on a display section of the television receiver is provided by a video signal supplied from a respective external device to the television receiver or by a broadcast signal received by an internal tuner of the television receiver such that when the common key is operated and the inquiring step is performed a result thereof indicates whether the video currently being displayed on the display section is provided by the video signal supplied from the respective external device or by the broadcast signal received by the internal tuner.

2. The remote control method as set forth in claim 1, wherein the second transmission step is performed by transmitting the remote control signal to the external device through a remote control signal conversion device.

3. A remote control apparatus for a device under control which selects one of an information signal of the device under control and an information signal from at least one external device, comprising:
    an operation section having a plurality of keys including a number of common keys and a number of dedicated keys;
    a conversion section which bidirectionally communicates with the device under control; and
    a control section which inputs an operation signal from the operation section and controls the communication section,
    wherein the control section inquires of the device under control about an information signal selection state when a common key is operated on the operation section,
    wherein the control section controls the communication section to transmit a remote control signal corresponding to the key that has been operated to the device under control when the information signal selection state replied from the device under control represents a signal selection state of the device under control,
    wherein the control section controls the communication section to transmit a remote control signal corresponding to the key that has been operated to the external device when the information signal selection state replied from the device under control represents a signal selection state of the external device,
    in which the device under control is a television receiver,
    in which each of the common keys commonly controls both the television receiver and the external device, and each of the dedicated keys controls only one of the television receiver and the external device,
    in which the inquiring step is only performed when a common key is operated such that the inquiring step is not performed when a dedicated key is operated, and
    in which the selection state indicates whether a video currently being displayed on a display section of the television receiver is provided by a video signal supplied from a respective external device to the television receiver or by a broadcast signal received by an internal tuner of the television receiver such that when the common key is operated and inquiring by the control section is performed a result thereof indicates whether the video currently being displayed on the display section is provided by the video signal supplied from the respective external device or by the broadcast signal received by the internal tuner.

4. The remote control apparatus as set forth in claim 3, wherein the control section controls the communication section to transmit the remote control signal to the external device through a remote control signal conversion device.

* * * * *